(12) United States Patent
Poole et al.

(10) Patent No.: US 9,725,129 B2
(45) Date of Patent: Aug. 8, 2017

(54) STREAMLINED AEROBAR FOR BICYCLE

(71) Applicant: Aerocat LLC, Portland, IN (US)

(72) Inventors: David L. Poole, Portland, IN (US); Daniel W. Hiller, Portland, IN (US)

(*) Notice: Subject to any disclaimer, the term of this patent is extended or adjusted under 35 U.S.C. 154(b) by 0 days.

(21) Appl. No.: 14/972,401

(22) Filed: Dec. 17, 2015

(65) Prior Publication Data

US 2016/0176468 A1    Jun. 23, 2016

Related U.S. Application Data

(60) Provisional application No. 62/096,021, filed on Dec. 23, 2014.

(51) Int. Cl.
| | |
|---|---|
| *B62K 21/12* | (2006.01) |
| *B62K 3/02* | (2006.01) |
| *B62M 25/04* | (2006.01) |
| *B62K 23/06* | (2006.01) |

(52) U.S. Cl.
CPC .............. *B62K 21/12* (2013.01); *B62K 3/02* (2013.01); *B62K 21/125* (2013.01); *B62K 23/06* (2013.01); *B62M 25/04* (2013.01)

(58) Field of Classification Search
CPC .............................. B62K 21/12; B62K 21/125
See application file for complete search history.

(56) References Cited

U.S. PATENT DOCUMENTS

| | | | | |
|---|---|---|---|---|
| 4,750,754 A * | 6/1988 | Lennon | ................ | B62K 21/125 188/24.22 |
| 4,878,397 A * | 11/1989 | Lennon | ................ | B62K 21/125 74/551.1 |
| 6,092,438 A * | 7/2000 | Soto | ................ | B62K 21/12 74/551.1 |
| D499,055 S * | 11/2004 | Chiang | ................ | B62K 21/12 D12/178 |
| D613,651 S * | 4/2010 | Gisbert | ................ | B62K 21/12 D12/178 |
| 7,698,967 B2 * | 4/2010 | Ording | ................ | B62K 21/12 74/551.1 |
| 7,788,992 B2 * | 9/2010 | Andrews | ................ | B62K 21/12 74/551.3 |
| 8,172,247 B2 * | 5/2012 | Weber | ................ | B62K 21/125 280/278 |
| 8,307,736 B2 * | 11/2012 | Lin | ................ | B62K 21/125 403/314 |
| 8,359,713 B1 * | 1/2013 | Chen | ................ | B62K 21/125 16/421 |
| 2005/0044981 A1 * | 3/2005 | Huang | ................ | B62K 21/125 74/551.8 |
| 2005/0109151 A1 * | 5/2005 | Chiang | ................ | B62K 21/125 74/551.1 |

(Continued)

*Primary Examiner* — Joseph Rocca
*Assistant Examiner* — Michael Stabley
(74) *Attorney, Agent, or Firm* — Keith Swedo

(57) ABSTRACT

A bicycle handlebar includes a midsection attached to a front mounting post of a bicycle and extending outward from the front mounting post in a substantially horizontal plane. A pair of pad-support sections are respectively disposed on opposite lateral sides of the midsection. A pair of arm support pads are each attached to a respective one of the pad-support sections such that each pad-support section and attached arm support pad conjunctively have an airfoil-shaped cross section. Each arm support pad supports a respective arm of a bicycle rider.

20 Claims, 8 Drawing Sheets

(56) References Cited

U.S. PATENT DOCUMENTS

| | | | |
|---|---|---|---|
| 2005/0132839 A1* | 6/2005 | Chen | B62K 21/125 74/551.8 |
| 2008/0053266 A1* | 3/2008 | Smolik | B62J 11/00 74/551.8 |
| 2008/0168857 A1* | 7/2008 | Chiang | B62K 21/12 74/551.1 |
| 2009/0095116 A1* | 4/2009 | Barnes | B62K 21/125 74/502.2 |
| 2013/0032001 A1* | 2/2013 | Smart | B62J 9/003 74/551.8 |

\* cited by examiner

STREAMLINED AEROBAR FOR BICYCLE

TECHNICAL FIELD

These claimed embodiments relate to a streamlined bicycle handlebar providing a more ergonomic fit for a cyclist.

BACKGROUND OF THE INVENTION

Most bicycles use a handlebar to control the direction of the bicycle. It is considered a necessary and critical part of the bicycle.

Bicycles are human powered vehicles and therefore the efficiency of the bicycle is extremely important to achieve acceptable speed. This is especially critical for competition racing bicycles. The efficiency of the bicycle depends on many variables. With modern technology the drive train efficiency on a competitive bicycle is 96% or higher. Friction of the drive components, rolling resistance of the wheels, etc. . . . are nearly perfect from an efficiency standpoint. Since the drive train efficiency has become nearly perfect on competition bicycles, it is well known within the sport that nearly all of the impedance to the cyclist speed is caused by air resistance. Therefore, almost all of the development for faster bicycles has become centered around improving the aerodynamics of the bicycle and the cyclist's position.

There are many different disciplines and forms of bicycle racing. When cyclists are allowed to draft behind other cyclist or group of cyclists, there are specific rules to make sure the position of the cyclist and design of the bicycle does not compromise control and the safety of the sport. There are several disciplines in bicycle racing that do not allow riding closely behind another rider to work as a team or group. The sport of Triathlon (swim, bike, run) is one such example.

The sport of professional and more specifically non-professional triathlon has grown rapidly over the past 30 years since the first IronMan event was held in Hawaii. Therefore, the market for competition bicycles specifically designed for triathlon racing has become significant.

A typical handlebar for a triathlon bike (also referred to as TT Bike). Includes a basebar, arm pads, extension arm, external shifters, and brake levers. This type of handlebar is typically referred to as an aerobar. The short comings of these typical aerobars are that they have low aerodynamic efficiency and uncomfortable ergonomics for the rider.

Existing art uses an insufficient approach to provide a place for the rider's arms while he is down in the "aero" position. In the "aero" position the rider rests his elbows on discrete arm pads that are mounted above a wing shaped basebar. The arm pads typically are mounted to the basebar using several brackets, screws, bolts, and miscellaneous other hardware. Because the size of the arm pads is relatively small cupped sized (in order to reduce weight and aerodynamic drag) the width of the rider's arms are mostly in a fixed position while riding the bike. Over time this can cause uncomfortable cramping in the neck, shoulders, arms, and hands during long rides. It has been shown in wind tunnel testing that aerodynamic drag caused by the rider's body are significantly reduced when the arms are placed close together versus wide apart. Therefore, most competitive riders attempt to locate the arm pads in a narrow position which in turn causes discomfort during long rides for example exceeding 60 minutes. Several competitive events such as Ironman triathlons require 5 or more hours on the bike.

Referring to FIGS. 1-2, handlebar 23 is an example of existing art and specifically illustrates the arm pad design. Arm pads 51a and 51b are supported by platforms 49a and 47b respectively. Platforms 49a and 49b are supported by brackets 47a and 47b respectively. Brackets 47a and 47b are supported by basebar 41 with a clamping action caused by tightening bolts 43a, 43b, 45a, and 45b. Bolts 53a, 55a, and 57a secure platform 49a to bracket 47a. Bolts 53b, 55b, and 57b secure platform 49b to bracket 47b.

Referring to FIG. 3, handlebar 23 is shown with rider's arms 71 and 73 resting on arm pads 51a and 51b respectively. The width between the arms is substantially fixed in a pre-defined position determined by the location of brackets 47a and 47b (FIG. 2) respectively.

U.S. patent application Ser. No. 14/090,189 discloses a bicycle brake system in which an elongated member is attach to a front mounting post of a bicycle and extends outward from the front mounting post in a substantially horizontal plane. The elongated member includes a pair of wide main sections respectively disposed adjacent the midsection and is adapted to support arms of a bicycle rider when the elongated member is attached to the front mounting post.

SUMMARY OF THE INVENTION

The subject invention may eliminate the need for the above hardware of FIGS. 1-2 and therefore may reduce the overall weight and aerodynamic drag of a bicycle. More particularly, a bicycle handlebar is provided that includes an elongated member having a top and a bottom. The elongated member includes a narrow midsection that attaches to a front mounting post of a bicycle and attaches to remainders of the elongated member which extend in opposite horizontal directions laterally outward from the narrow midsection. The remainders of the elongated member include a pair of wide main sections respectively disposed adjacent the midsection to support arms of a bicycle rider on the top when the elongated member is attached to the front mounting post. The member includes a first and second recess respectively disposed adjacent each end of the member on the top. A first and second pad material fills in the top recesses of the elongated member. A first and a second opening in the elongated member allow for the insertion of first and second extension arms extending forward for the cyclist's hands. First and second shifter levers are inserted into said extension arms, enabling the cyclist to change gears. First and second brake levers are attached at each end of the elongated member and enable the cyclist to stop the bike by actuating the levers.

A bicycle is provided that includes a bicycle frame with a front mounting post. A front wheel and a back wheel are coupled to the bicycle frame. The bicycle has a handlebar that includes an elongated member having a top and a bottom. The elongated member includes a narrow midsection attached to the front mounting post and extending forward from the front mounting post in a substantially horizontal plane. The elongated member includes a pair of wide main sections respectively disposed adjacent the midsection. Tops of the pair of wide main sections support the arms of a bicycle rider. The member includes a first and second recess respectively disposed adjacent each end of the member on the top. A first and second pad material fills in the top recesses of the elongated member. A first and a second opening in the elongated member allow for the insertion of first and second extension arms extending forward for the cyclist's hands. First and second shifter levers are inserted into said extension arms, enabling the cyclist to change gears. First and second brake levers attached at each end of the elongated member and enable the cyclist to stop the bike by actuating the levers.

The invention may provide improved aerodynamics of the handlebar apparatus; provide improved ergonomics of the handlebar apparatus; and may substantially reduce the overall weight and complexity of the handlebar apparatus.

The subject invention solves the technical problems of the prior art described above by employing a new approach to arm pad and base bar design. In this new approach, the arm pads are coupled with the supporting basebar so that together they form a symmetrical airfoil or aerofoil wing shape. The padded symmetrical aerofoil cross section makes up a substantial portion of the overall width of the aerobar.

This new approach eliminates the separate hardware for the arm pads such as a metal cup or platform, mounting brackets, bolts, washers, and nuts. Eliminating these hardware pieces substantially reduces the weight of the handlebar apparatus. Because the combined shape of the arm pad and basebar together make up a symmetrical shaped aerofoil, the aerodynamic drag is substantially reduced. Wind tunnel testing has shown more than 50% of the aerodynamic drag caused by the handlebar apparatus can be removed by the subject invention. By making the arm pad area apply over a substantial width of the handlebar apparatus, the rider has the option during riding the bicycle to place his arms close together or wide apart. This flexibility of arm placement provides added comfort and strategic advantage while riding the bicycle. The rider has the option to place his arms close together, for example, while pedaling in a strong headwind or descending a hill to gain maximum efficiency when the air velocity is high. At other times, such as when experiencing a strong tail wind or ascending a hill, the rider can choose to place his arms farther apart to provide more comfort or to be in a position to have more leverage for pedaling.

In one embodiment, the invention comprises a bicycle handlebar including a midsection attached to a front mounting post of a bicycle and extending outward from the front mounting post in a substantially horizontal plane. A pair of pad-support sections are respectively disposed on opposite lateral sides of the midsection. A pair of arm support pads are each attached to a respective one of the pad-support sections such that each pad-support section and attached arm support pad conjunctively have an airfoil-shaped cross section. Each arm support pad supports a respective arm of a bicycle rider.

In another embodiment, the invention comprises a bicycle including a bicycle frame with a front mounting post. A front wheel and a back wheel are coupled to the bicycle frame. A handlebar includes a midsection attached to the front mounting post, and an airfoil. The airfoil includes a pair of pad-support sections respectively disposed on opposite lateral sides of the midsection, and a pair of arm support pads each attached to a respective one of the pad-support sections such that the airfoil has a teardrop shape in a vertical cross-sectional view. Each arm support pad supports a respective arm of a bicycle rider.

In yet another embodiment, the invention comprises a bicycle handlebar including a midsection attached to a front mounting post of a bicycle. An airfoil includes a pair of pad-support sections respectively connected to the midsection on opposite lateral sides of the midsection. A pair of arm support pads are each attached to a respective one of the pad-support sections. The pad-support sections and/or the arm support pads each have a hemi-teardrop shape in a vertical cross-sectional view. Each arm support pad supports a respective arm of a bicycle rider.

BRIEF DESCRIPTION OF THE DRAWINGS

The detailed description is described with reference to the accompanying figures. The use of the same reference number in different figures indicates similar or identical items.

DETAILED DESCRIPTION

Figure 1:
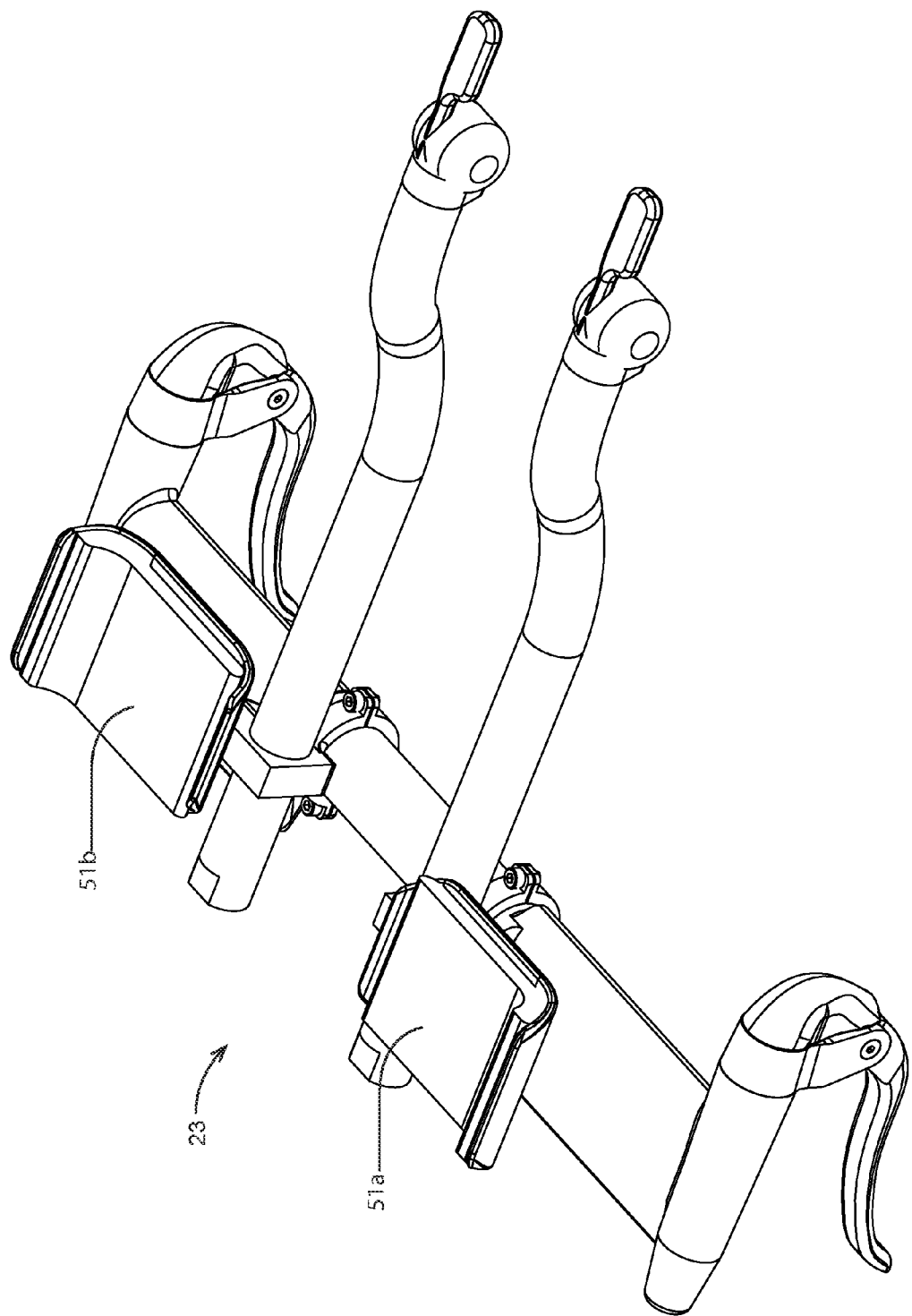
FIG. 1 is a perspective view of example existing art.
Figure 2:
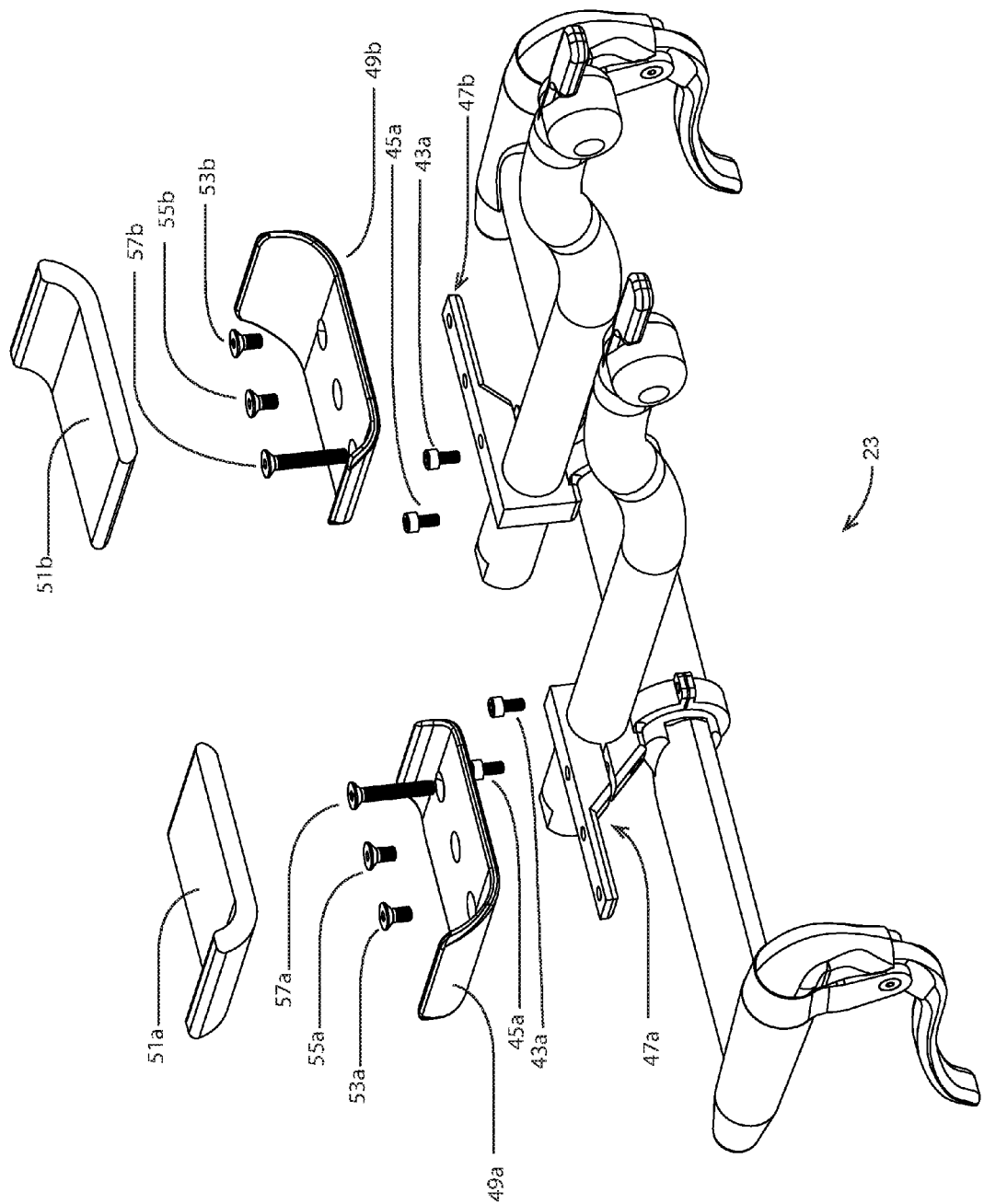
FIG. 2 is a perspective exploded view of example existing art.
Figure 3:
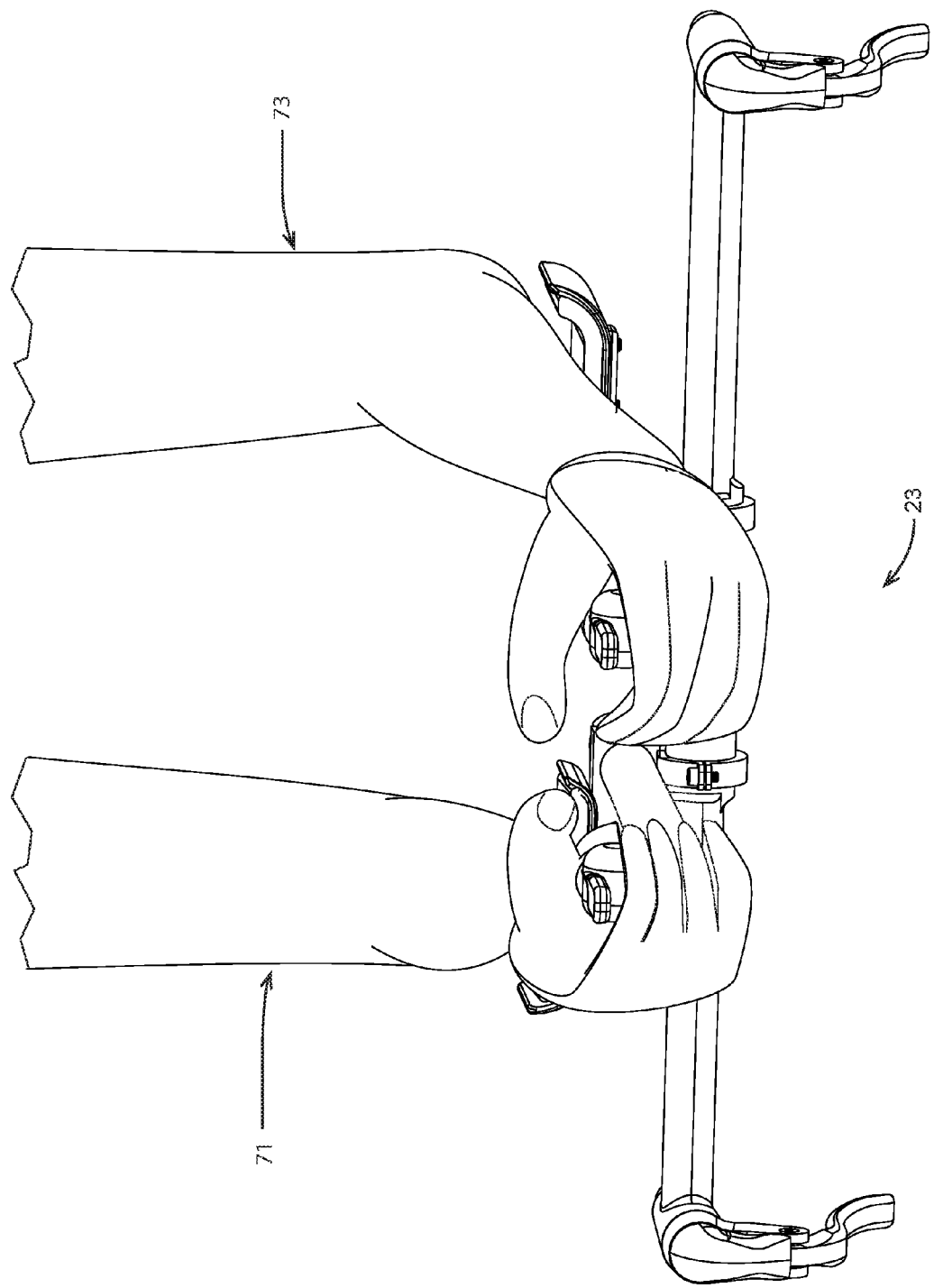
FIG. 3 is a perspective view of example existing art showing the positions of a rider's hands and arms.
Figure 4:
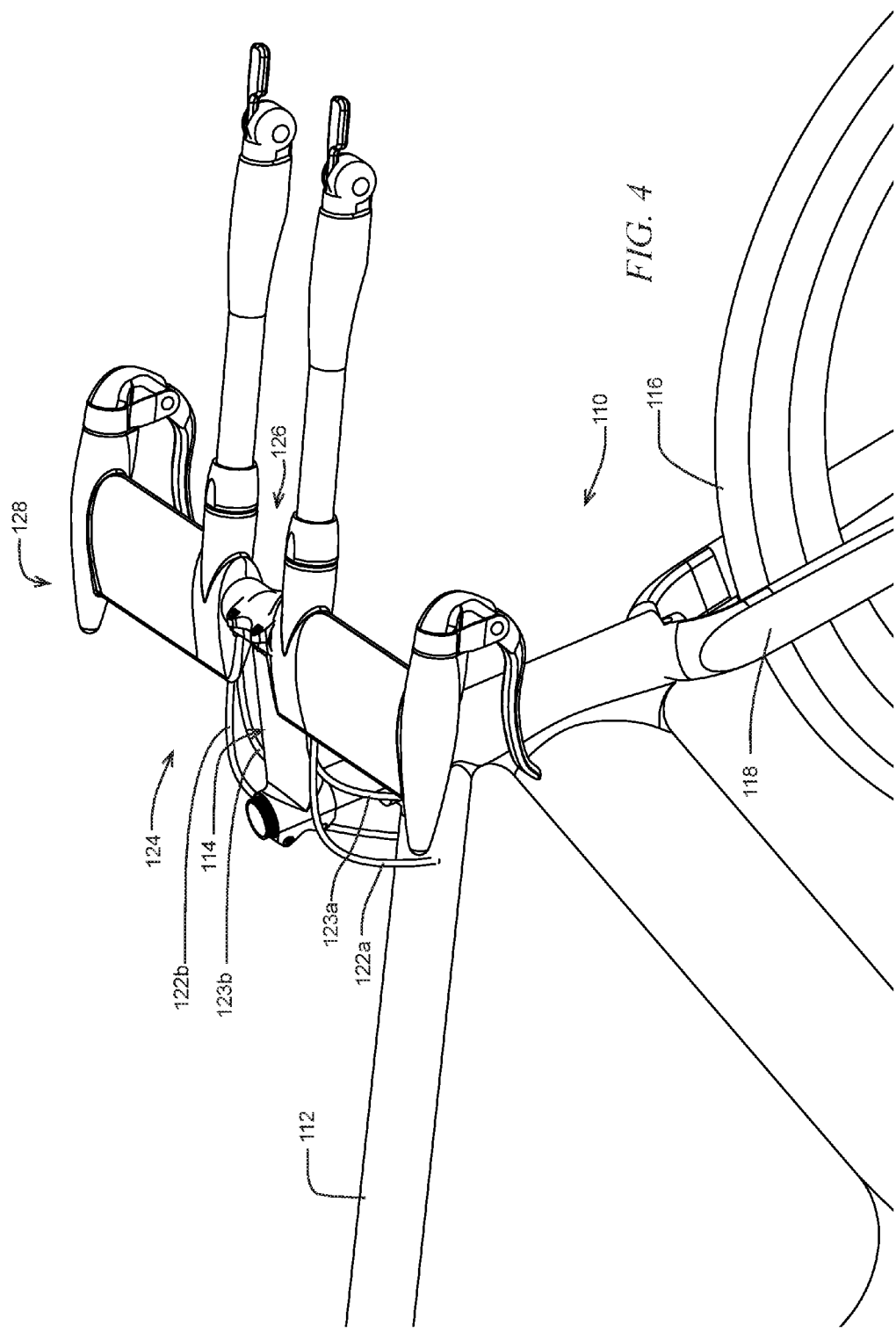
FIG. 4 is a top-side perspective view of a handlebar mounted on a bicycle according to one embodiment of the invention.

Referring to FIG. 4, there is shown bicycle 110 that includes a bicycle frame 112 coupled to a front mounting post 114, a front wheel 116 and a back wheel (not shown). A front brake 118 and a rear brake (not shown) are respectively coupled to the bicycle 110 for stopping rotation of the front wheel 116 and the back wheel. Front mounting post 114 is coupled to handlebar 124. Control cables 122a and 122b are coupled to bar end shifters 172a and 172b (FIG. 5) respectively and are coupled to derailleurs (not shown) to enable the cyclist to change gears. Control cables 123a and 123b are coupled to brake levers 142a and 142b respectively and are coupled to brake calipers (not shown) to enable the cyclist to stop the bicycle. The bar end shifters and brake levers are commercially available items from several large manufacturers such as Shimano Inc., for example.

Figure 5:
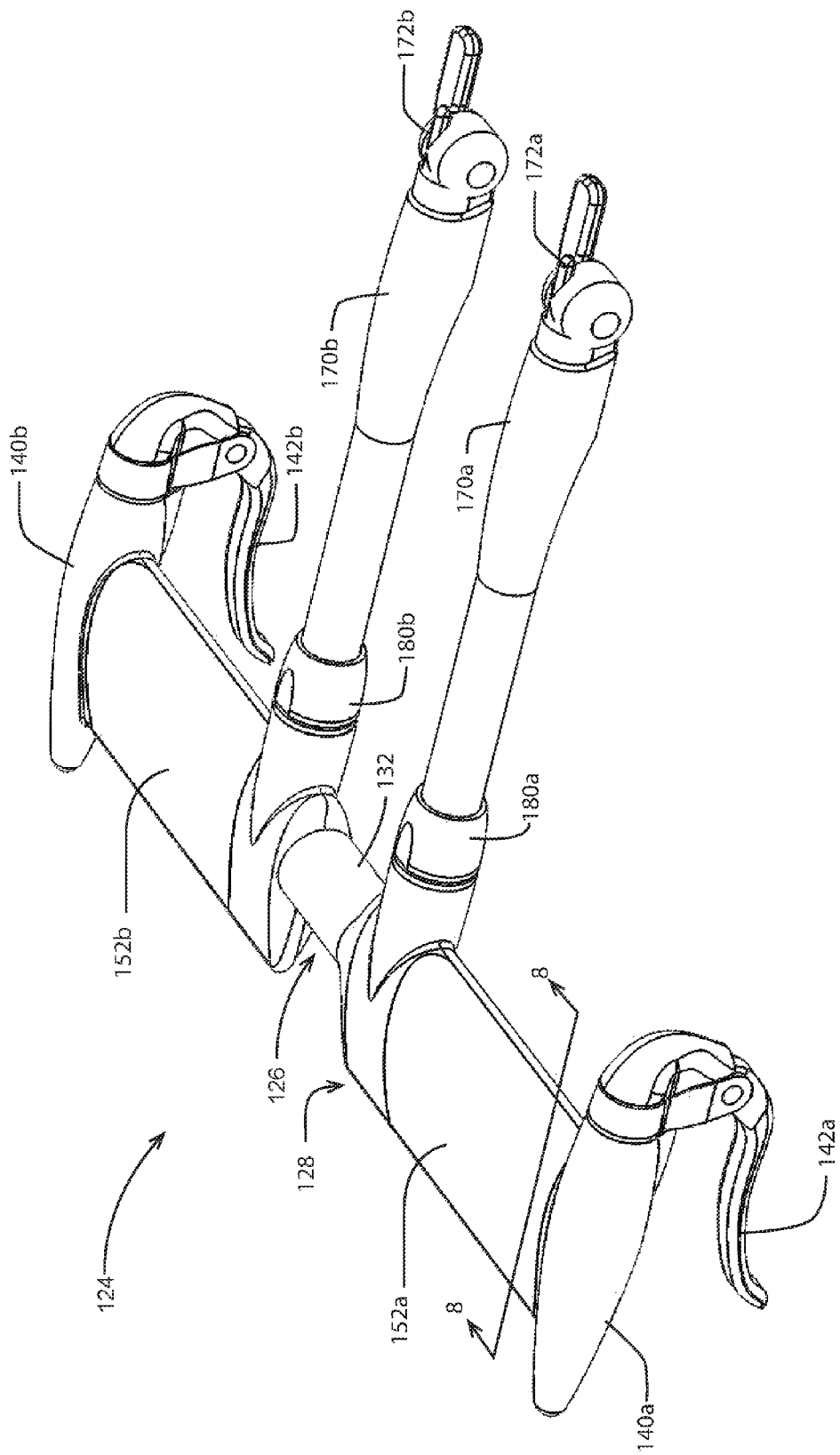
FIG. 5 is a top perspective view of the handle bar including the brake system and shifting mechanism.
Figure 6:
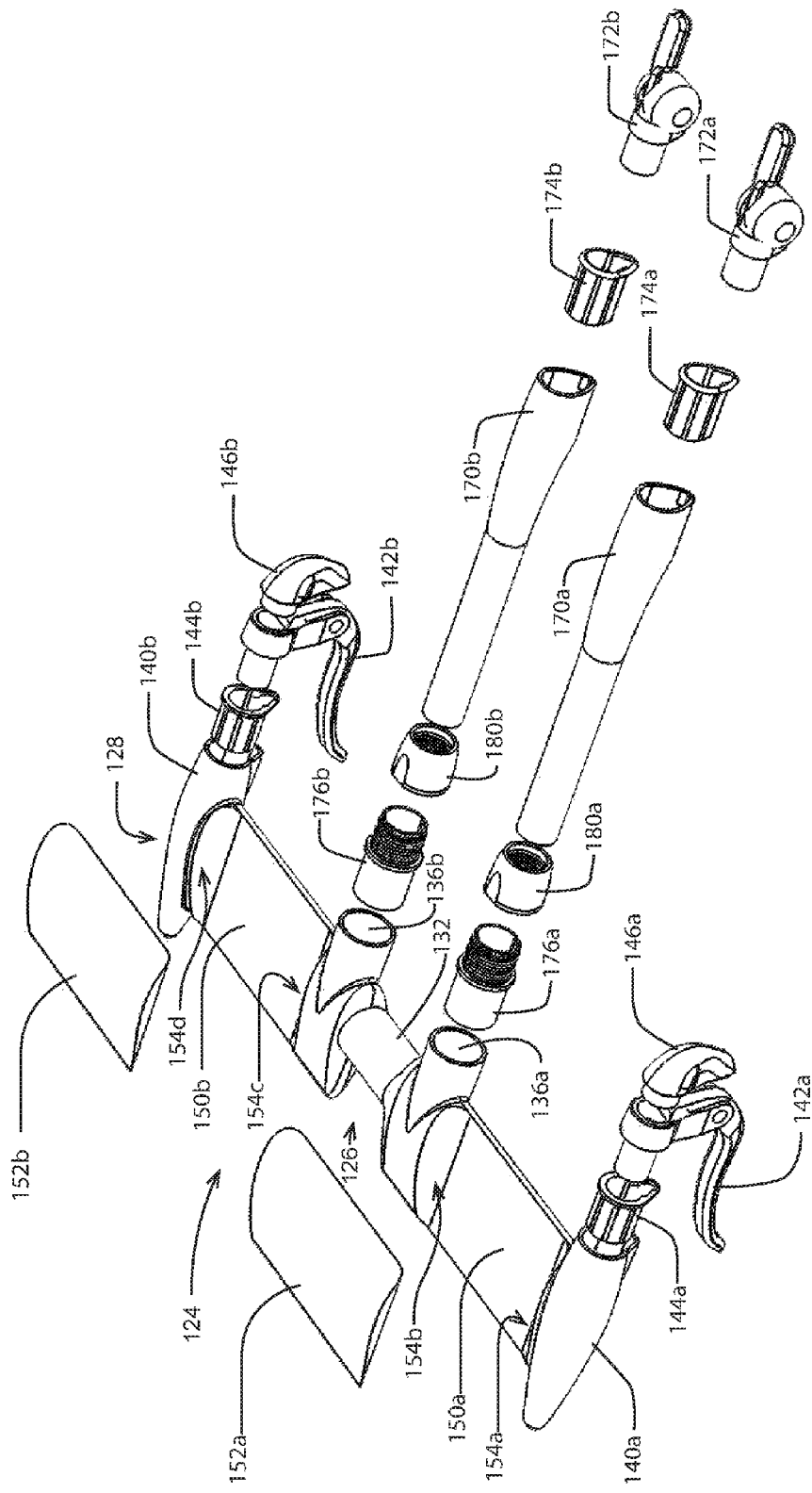
FIG. 6 is a top perspective exploded view of the handle bar.
Figure 7:
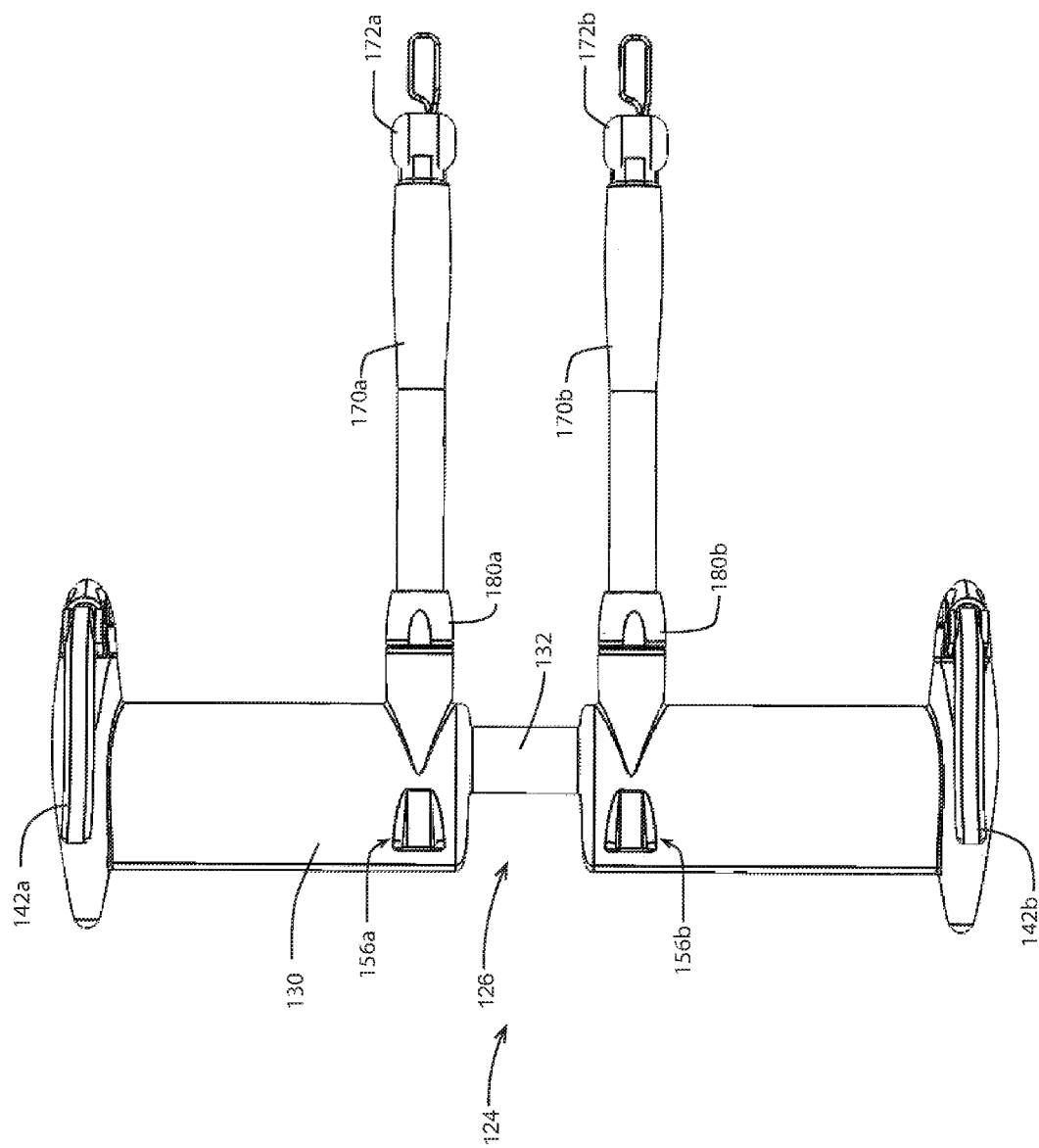
FIG. 7 is a bottom view of the handle bar.

Referring to FIGS. 5-7, handlebar 124 includes an elongated member 126 having a top 128 and a bottom 130. The elongated member 126 includes a narrow midsection 132 that attaches to the front mounting post 114 (FIG. 4). Member 126 extends outward from the front mounting post 114 in a substantially horizontal plane. The overall width of member 126 may be approximately 44 cm and may be designed to fit an average rider's shoulder width. Member 126 may be constructed with a rigid high strength material such as carbon fiber.

The elongated member 126 includes a pair of wide pad-support sections 150a, 150b respectively disposed adjacent the midsection 132. The pair of pad-support sections 150a and 150b couple with and support arm pads 152a and 152b respectively to comfortably support the arms of a bicycle rider on top 128 adjacent the pad-support sections 150a, 150b that substantially make up the width of member 126. Angled walls 154a, 154b extend from pad-support section 150a, and angled walls 154c, 154d extend from pad-support section 150b to define respective recesses for receiving respective arm pads 152a and 152b.

The member 126 forms protrusions 140a and 140b disposed adjacent each end of the member 126. The protrusions 140a and 140b are formed to support a rider's hands while steering the bicycle and pulling on brake lever assemblies 142a and 142b. The protrusions 140a and 140b take on the shape of a symmetrical aerofoil to minimize aerodynamic drag. Brake lever assemblies 142a and 142b are standard components available from manufacturers such as Shimano, Inc. End caps 146a and 146b couple to brake levers 142a and 142b respectively to provide an improved aerodynamic performance. Brake cables 123a and 123b attach to brake lever assemblies 142a and 142b respectively. A routing means is provided inside member 126 for brake cables 123a and 123b which exit member 126 through the ports 156a and 156b respectively and couple to the bicycle brake calipers (not shown). Members 144a and 144b are machined out of aluminum or other suitable material and are bonded into protrusions 140a and 140b respectively by means of an adhesive bonding material such as Locktite 9432NA. Brake lever assemblies 142a and 142b couple to members 144a and 144b respectively and may be secured with a compression bolt provided with the brake lever assemblies.

Both sides adjacent to narrow midsection 132 form protrusions 136a and 136b that receive inserts 176a and 176b respectively. Inserts 176a and 176b are bonded to members 136a and 136b respectively with an adhesive bonding material such as Locktite 9432A. Extension arms 170a and 170b are received into inserts 176a and 176b respectively. Inserts 176a and 176b are threaded with a standard 1 1/16"-12" UNJ thread pattern and slotted at the ends to allow a compression fit to extension arms 170a and 170b respectively. Tightening members 180a and 180b are standard available 37 degree aluminum flared fittings known as JIC (Joint Industrial Council) fittings. Tightening members 180a and 180b have a modified outside profile to improve aerodynamic performance. Extension arms 170a and 170b can have an adjustable length to fit riders with different size arms. For example, extension arms 170a and 170b may be telescoping. Tightening members 180a and 180b secure the position of 170a and 170b extension arms respectively. Inserts 174a and 174b, which may be formed of machined aluminum, couple bar end shifters 172a and 172b to extension arms 170a and 170b respectively. Inserts 174a and 174b may be permanently bonded to extension arms 170a and 170b with an adhesive such as Locktite 9432A. Bar end shifters 172a and 172b may be standard available components from manufacturers such as Shimano Inc. Bar end shifters 172a and 172b may be connected to the bicycle gear derailleurs (not shown) by cables 122a and 122b. A routing means is provided inside extension arms 170a, 170b, and member 126 which exits through ports 156a and 156b respectively and couples to the bicycle derailleurs (not shown) to enable the rider to change the gear ratio.

Figure 8:
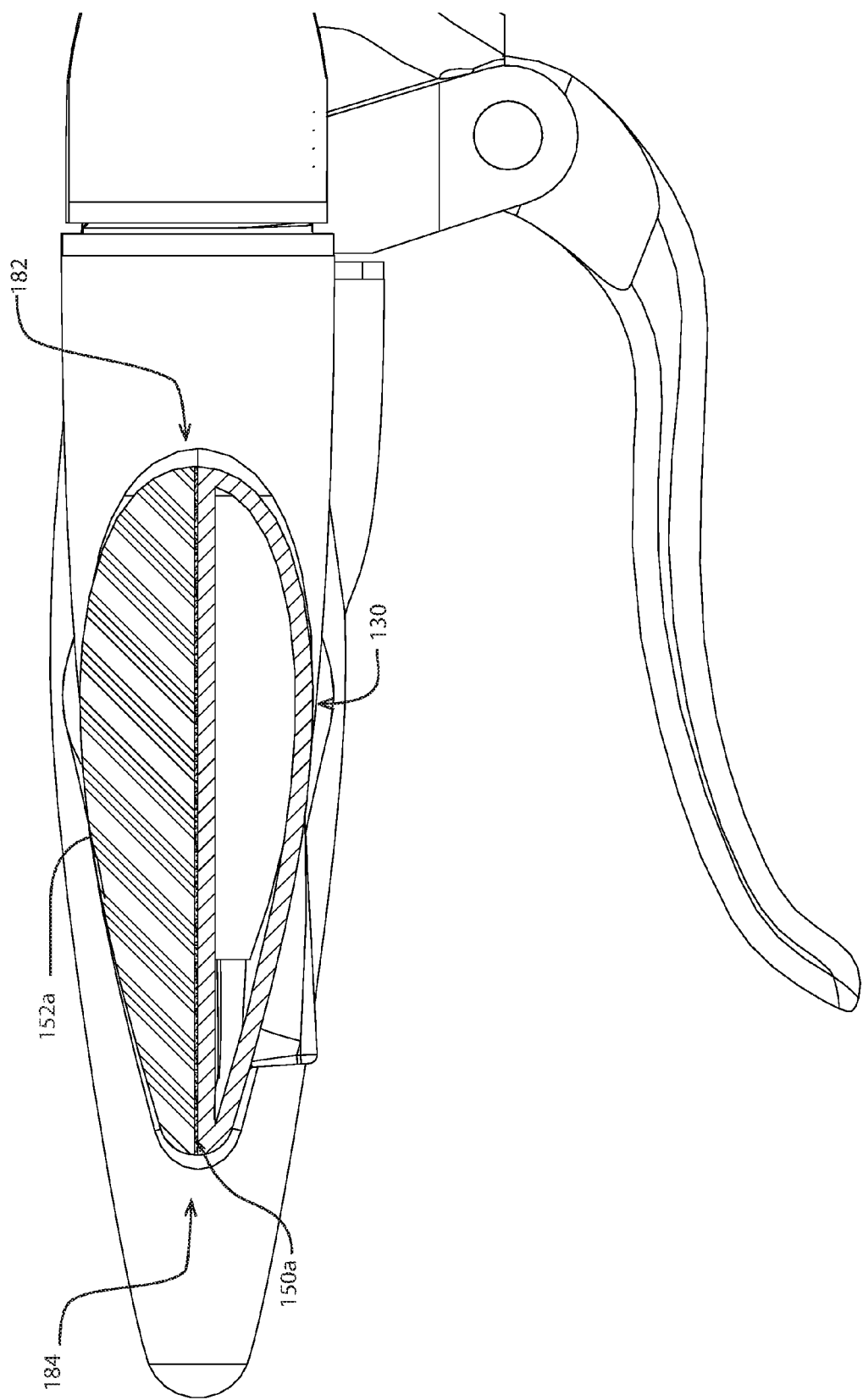
FIG. 8 is a cross-sectional view in across a vertical plane along line 8-8 in FIG. 5 of the arm pad section to illustrate the symmetrical wing shaped aerofoil created by the arm pad and basebar.

Arm pads 152a and 152b may be made with a flexible foam material such as polyethylene that is standardly available from many sources. Arm pads 152a and 152b may be cut with a standard hot wire process to fit into respective recesses defined by pad-support section 150a and angled walls 154a and 154b, and by pad-support section 150b and angled walls 154c and 154d, respectively. As best shown in FIG. 8, the top side of arm pad 152a (as well as arm pad 152b) is cut to a shape that creates a symmetrical aerofoil matching the profile of member 126 bottom side 130. Arm pads 152a-b and pad-support sections 150a, 150b may each individually have an airfoil-shaped cross section with a flat surface. The respective flat surfaces of arm pads 152a-b and pad-support sections 150a, 150b may engage each other to form an overall airfoil-shaped cross section without a flat surface. Arm pads 152a and 152b may be attached to pad-support sections 150a, 150b and possibly to angled walls 154a-d with an adhesive such as a double sided thin adhesive tape, for example, available from ShurTech Brands LLC. The overall height of the symmetrical airfoil may be approximately one inch (measured from peak to peak) and the length (the lateral direction extending left and right in FIG. 8) between a leading edge 182 and a trailing edge 184 of the airfoil may be approximately three inches. Thus, the ratio of length to height may be compliant with UCI (Union Cycliste Internationale) rules. Higher ratios of length to height are possible within the scope of the invention, and may provide improved aerodynamics.

Each of pad-support sections 150a, 150b and arm pads 152a and 152b may have a varying height relative to the length direction, which is the same as the length direction of the bicycle. Each of pad-support sections 150a, 150b may have a maximum height that is closer to a leading edge of the pad-support section than to a trailing edge of the pad-support section. Similarly, arm pads 152a and 152b may have a maximum height that is closer to a leading edge of the arm pad than to a trailing edge of the arm pad. Each of pad-support sections 150a, 150b and arm pads 152a and 152b may individually have a hemi-teardrop shape. Each of pad-support sections 150a, 150b and the corresponding one of arm pads 152a, 152b may conjointly have a teardrop shape. Further, the heights of pad-support sections 150a, 150b and arm pads 152a and 152b may be equal to each other at each point along their length. That is, the heights of pad-support sections 150a, 150b and arm pads 152a and 152b may be symmetrical or mirror images of each other.

The exterior surfaces of pad-support sections 150a, 150b and arm pads 152a and 152b may be entirely continuously curved in the vertical cross-sectional view of FIG. 8. These exterior surfaces may be entirely continuously arcuate and entirely continuously convex in the vertical cross-sectional view.

A shape of the exterior surfaces of arm pads 152a, 152b may be defined by:

$$x = \cos t$$

$$y = \sin t \sin^m(t/2)$$

wherein x is an axis oriented in the length direction and defined from a leading edge of the arm pad to a trailing edge of the arm pad, and y is an axis aligned with the height direction. For example, if t=0, then x=1 and y=0, which may correspond to the trailing edge of the arm pad. Also, if t=π/2, then x=−1 and y=0, which may correspond to the leading edge of the arm pad. The exponential variable m in the equation may be some value greater than 7 in one embodiment.

Similarly, a shape of the exterior surfaces of pad-support sections 150a, 150b may be defined by:

$$x = \cos t$$

$$-y = \sin t \sin^m(t/2)$$

wherein x is an axis oriented in the length direction and defined from a leading edge of the pad-support section to a trailing edge of the pad-support section, and y is an axis aligned with the height direction. For example, if t=0, then x=1 and y=0, which may correspond to the trailing edge of the pad-support section. Also, if t=π/2, then x=−1 and y=0, which may correspond to the leading edge of the pad-support section. The exponential variable m in the equation may be some value greater than 7 in one embodiment.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A bicycle handlebar comprising:
   a midsection configured to attach to a front mounting post of a bicycle and extend outward from the front mounting post in a substantially horizontal plane;
   a pair of pad-support sections respectively disposed on opposite lateral sides of the midsection; and
   a pair of arm support pads each attached within a recess of a respective one of the pad-support sections as defined by angled walls such that each said pad-support section and attached said arm support pad conjunctively have an airfoil-shaped cross section, each said arm support pad being adapted to support a respective arm of a bicycle rider.

2. The bicycle handlebar of claim 1 wherein the airfoil-shaped cross section is across a vertical plane.

3. The bicycle handlebar of claim 1 wherein each said pad-support section and attached said arm support pad conjunctively have a varying height relative to a length direction between a leading edge and a trailing edge of the arm support pad, the varying height having a maximum that is closer to the leading edge of the arm support pad than to the trailing edge of the arm support pad.

4. The bicycle handlebar of claim 1 wherein each said pad-support section has an exterior surface that is entirely continuously curved in a vertical cross-sectional view.

5. The bicycle handlebar of claim 1 wherein each said arm support pad has an exterior surface that is entirely continuously curved in a vertical cross-sectional view.

6. The bicycle handlebar of claim 1 wherein each said pad-support section has an exterior surface that is entirely continuously arcuate in a vertical cross-sectional view.

7. The bicycle handlebar of claim 1 wherein each said arm support pad has an exterior surface that is entirely continuously arcuate in a vertical cross-sectional view.

8. The bicycle handlebar of claim 1 wherein each said pad-support section has an exterior surface that is entirely continuously convex in a vertical cross-sectional view.

9. The bicycle handlebar of claim 1 wherein each said arm support pad has an exterior surface that is entirely continuously convex in a vertical cross-sectional view.

10. The bicycle handlebar of claim 1 wherein each said pad-support section and said attached arm support pad conjunctively have a teardrop shape in a vertical cross-sectional view.

11. The bicycle handlebar of claim 1 wherein at least one of said pad-support section and said attached arm support pad has a hemi-teardrop shape in a vertical cross-sectional view.

12. The bicycle handlebar of claim 1 wherein each said arm support pad has an exterior surface with a shape defined by:

$$x = \cos t$$

$$y = \sin t \sin^m(t/2)$$

wherein x is a horizontal axis defined from a leading edge of the arm support pad to a trailing edge of the arm support pad in a length direction, and y is an axis aligned with a vertical direction.

13. The bicycle handlebar of claim 12 wherein each said pad-support section has an exterior surface with a shape defined by:

$$x = \cos t$$

$$-y = \sin t \sin^m(t/2)$$

wherein x is a horizontal axis defined from a leading edge of the pad-support section to a trailing edge of the pad-support section in a length direction, and y is an axis aligned with a vertical direction.

14. A bicycle, comprising:
   a bicycle frame with a front mounting post;
   a front wheel and a back wheel coupled to the bicycle frame; and
   a handlebar including:
   a midsection attached to the front mounting post; and
   an airfoil including:
      a pair of pad-support sections respectively disposed on opposite lateral sides of the midsection; and
      a pair of arm support pads each attached within a recess of a respective one of the pad-support sections as defined by angled walls such that the airfoil has a teardrop shape in a vertical cross-sectional view, each said arm support pad being adapted to support a respective arm of a bicycle rider.

15. The bicycle of claim 14 wherein the airfoil has a varying height relative to a length direction between a leading edge and a trailing edge of the airfoil, the varying height having a maximum that is closer to a leading edge of the airfoil than to a trailing edge of the airfoil.

16. The bicycle of claim 14 wherein said airfoil has an exterior surface that is entirely continuously curved in a vertical cross-sectional view.

17. The bicycle of claim 14 wherein at least one of said pad-support section and said attached arm support pad has a hemi-teardrop shape in a vertical cross-sectional view.

18. A bicycle handlebar, comprising:
   a midsection configured to be attached to a front mounting post of a bicycle; and
   an airfoil including:
      a pair of pad-support sections respectively connected to the midsection on opposite lateral sides of the midsection; and
      a pair of arm support pads each attached within a recess of a respective one of the pad-support sections as defined by angled walls, at least one of the pad-support sections and the arm support pads having a hemi-teardrop shape in a vertical cross-sectional view, each said arm support pad being adapted to support a respective arm of a bicycle rider.

19. The bicycle handlebar of claim 18 wherein said at least one of the pad-support sections and the arm support pads having a hemi-teardrop shape in a vertical cross-sectional view has a varying height relative to a length direction between a leading edge and a trailing edge of the airfoil, the varying height having a maximum that is closer to the leading edge of the airfoil than to the trailing edge.

20. The bicycle handlebar of claim 18 wherein said at least one of the pad-support sections and the arm support pads having a hemi-teardrop shape in a vertical cross-sectional view has an exterior surface that is entirely continuously convex in a vertical cross-sectional view.

* * * * *